United States Patent
Marcella-O'Leary et al.

(10) Patent No.: US 11,598,253 B1
(45) Date of Patent: Mar. 7, 2023

(54) PNEUMATIC RESONATOR AND ACCUMULATOR SYSTEM FOR CONTROL OF TURBOCHARGER WASTEGATE MOVEMENT

(71) Applicant: GM GLOBAL TECHNOLOGY OPERATIONS LLC, Detroit, MI (US)

(72) Inventors: Lisa M. Marcella-O'Leary, Howell, MI (US); David J. Hajdyla, Canton, MI (US); Grant Brady, Fenton, MI (US); Bret J. Kukulis, Swartz Creek, MI (US); Robert S. McAlpine, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/743,087

(22) Filed: May 12, 2022

(51) Int. Cl.
 F02B 37/18 (2006.01)
 F15B 1/02 (2006.01)

(52) U.S. Cl.
 CPC ............ *F02B 37/186* (2013.01); *F15B 1/021* (2013.01)

(58) Field of Classification Search
 CPC .............................................. F02B 37/18–186
 See application file for complete search history.

(56) References Cited

U.S. PATENT DOCUMENTS

| | | | |
|---|---|---|---|
| 8,727,070 B2 * | 5/2014 | Huber | F23M 20/005 123/184.55 |
| 2011/0299197 A1 * | 12/2011 | Eguchi | G11B 5/4873 360/274 |

* cited by examiner

*Primary Examiner* — Ngoc T Nguyen

(57) ABSTRACT

A wastegate system of a vehicle includes: a wastegate valve configured to regulate exhaust flow through a turbine of a turbocharger of an engine; a wastegate actuator including a lever that is mechanically coupled to the wastegate valve via one or more linkages and that is configured to move linearly based on a pressure within an interior of the wastegate actuator; a resonator that is fluidly coupled to the interior of the wastegate actuator via a first one or more hoses and that is configured to counteract force attributable to pressure changes in the exhaust from combustion events within the engine; and a regulator valve that is fluidly connected between a pneumatic source and the resonator via a second one or more hoses and that is configured to regulate the pressure within the interior of the wastegate actuator.

20 Claims, 4 Drawing Sheets

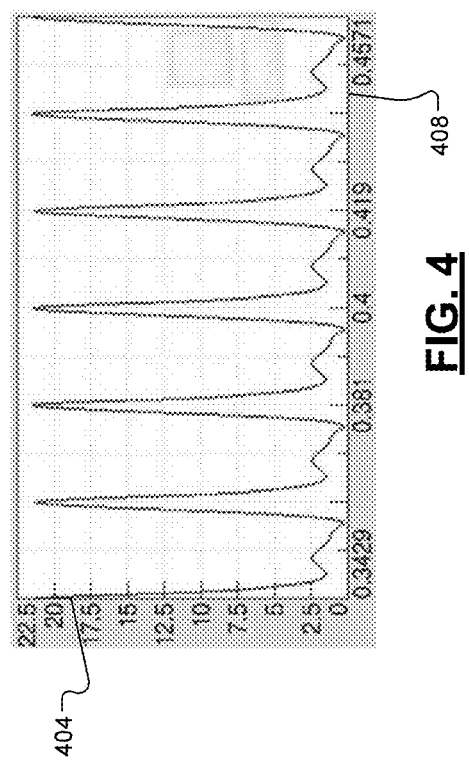

PNEUMATIC RESONATOR AND ACCUMULATOR SYSTEM FOR CONTROL OF TURBOCHARGER WASTEGATE MOVEMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to turbochargers and more particularly to pneumatic resonators and accumulators to control wastegate valve motion.

Some types of vehicles include only an internal combustion engine that generates propulsion torque. Hybrid vehicles include both an internal combustion engine and one or more electric motors. Some types of hybrid vehicles utilize the electric motor and the internal combustion engine to improve fuel efficiency. Other types of hybrid vehicles utilize the electric motor and the internal combustion engine to achieve greater torque output.

Examples of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

SUMMARY

In a feature, a wastegate system of a vehicle includes: a wastegate valve configured to regulate exhaust flow through a turbine of a turbocharger of an engine; a wastegate actuator including a lever that is mechanically coupled to the wastegate valve via one or more linkages and that is configured to move linearly based on a pressure within an interior of the wastegate actuator; a resonator that is fluidly coupled to the interior of the wastegate actuator via a first one or more hoses and that is configured to counteract force attributable to pressure changes in the exhaust from combustion events within the engine; and a regulator valve that is fluidly connected between a pneumatic source and the resonator via a second one or more hoses and that is configured to regulate the pressure within the interior of the wastegate actuator.

In further features, an accumulator is fluidly coupled between the pneumatic source and the regulator valve via a third one or more hoses and that is configured to damp pressure changes from the pneumatic source.

In further features, a first interior volume of the accumulator is greater than a second interior volume of the resonator.

In further features, the second one or more hoses is connected between the accumulator and the regulator valve.

In further features, an engine control module is configured to actuate the regulator valve based on a target opening of the wastegate valve.

In further features, the resonator, the first one or more hoses, and the second one or more hoses are configured to reduce an amplitude of motion of the lever, the one or more linkages, and the wastegate valve in a predetermined frequency range.

In further features, an interior volume of the resonator is approximately 110-125 cubic centimeters (cc).

In further features, a length of the first one or more hoses is approximately 100-150 millimeters (mm).

In further features, a length of the second one or more hoses is approximately 400-500 millimeters (mm).

In further features, the wastegate actuator further includes a spring configured to oppose the pressure within the interior of the wastegate actuator.

In further features, the pneumatic source is an electric pneumatic pump.

In further features, the pneumatic source is driven by rotation of a rotating component of the engine.

In further features, the rotating component is an exhaust camshaft.

In further features, vacuum within the interior of the wastegate actuator closes the wastegate valve and a decrease in vacuum within the interior of the wastegate actuator opens the wastegate valve.

In further features, positive pressure within the interior of the wastegate actuator closes the wastegate valve and a decrease in the pressure within the interior of the wastegate actuator opens the wastegate valve.

In a feature, a wastegate system of a vehicle includes: a wastegate valve configured to regulate exhaust flow through a turbine of a turbocharger of an engine; a wastegate actuator including a lever that is mechanically coupled to the wastegate valve via one or more linkages and that is configured to move linearly based on a pressure within an interior of the wastegate actuator; a resonator that is fluidly coupled to the interior of the wastegate actuator via a first one or more hoses and that is configured to damp motion of the lever, the one or more linkages, and the wastegate valve attributable to pressure changes in the exhaust from combustion events within the engine; a pneumatic source; a regulator valve that is configured to regulate the pressure within the interior of the wastegate actuator; and an accumulator that is fluidly coupled to the regulator valve via a second one or more hoses, that is fluidly coupled to the pneumatic source via a third one or more hoses, and that is configured to damp pressure changes from the pneumatic source, where wastegate actuator further includes a spring configured to oppose the pressure within the interior of the wastegate actuator.

In further features, a first interior volume of the accumulator is greater than a second interior volume of the resonator.

In further features, an engine control module module is configured to actuate the regulator valve based on a target opening of the wastegate valve.

In further features, the resonator, the first one or more hoses, and the second one or more hoses are configured to damp motion of the lever, the one or more linkages, and the wastegate valve in a predetermined frequency range.

In further features, the pneumatic source is one of (a) an electric pneumatic pump and (b) driven by rotation of a rotating component of the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is an example graph of force on a wastegate valve attributable to exhaust pressure over time.

In the drawings, reference numbers may be reused to identify similar and/or identical elements.

DETAILED DESCRIPTION

Some engines include one or more turbochargers that can be used to increase airflow into the engine. A turbocharger includes a turbine and a compressor. Exhaust flow through an exhaust system drives rotation of the turbine. Rotation of the turbine drives rotation of the compressor. The compressor increases a pressure of air input to the engine for combustion.

A wastegate regulates exhaust flow through the turbine. The wastegate can be opened to decrease exhaust flow through the turbine and closed to increase exhaust flow through the turbine. A wastegate actuator actuates the wastegate via one or more mechanical linkages. A pneumatic source, such as a vacuum source, pneumatically actuates the wastegate actuator.

The exhaust includes pressure increases attributable to combustion events within the engine. The pressure increases, however, may cause wear on the linkages(s) and/or the wastegate actuator.

The present application involves a pneumatic system that is fluidly connected between the pneumatic source and the wastegate actuator. The pneumatic system provides both flow resistance and compressible volume that creates damping and reduces motion of the wastegate and the linkage(s). The reduction in motion at the resonant frequencies reduces wear and increases lifetime. The pneumatic system may also include an accumulator volume that may counteract a response time delay and provides a balance between motion reduction and maximizing response time of actuating the wastegate. The pneumatic system also improves sound performance as sound produced by contact between mechanical components may be reduced.

Figure 1:
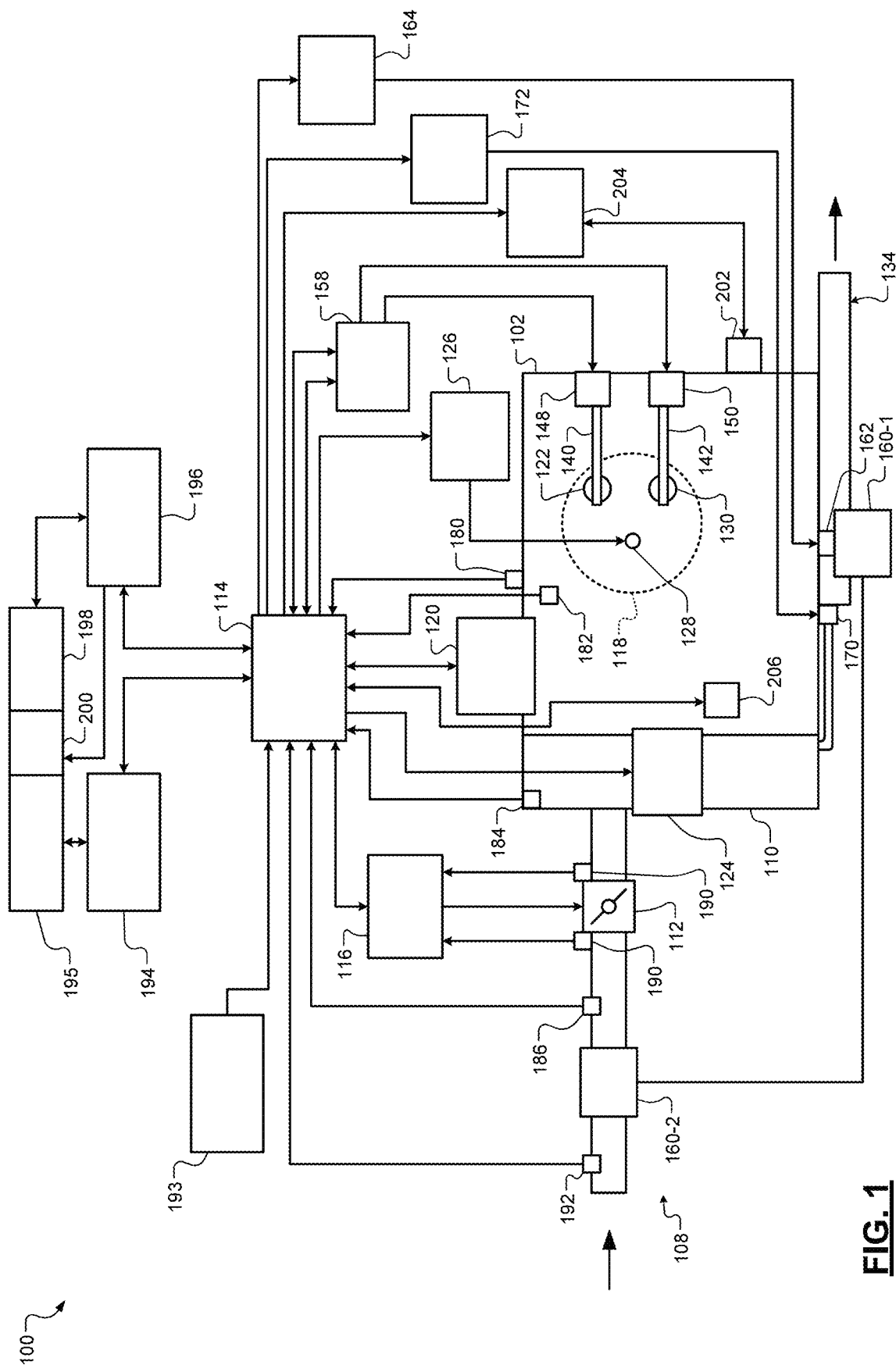
FIG. 1 is a functional block diagram of an example engine system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198 (electric machine). While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate 162, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery to the electric motor 198 to cause the electric motor 198 to output positive torque. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted. The present application is also applicable to the inclusion of multiple electric motors.

Figure 2:
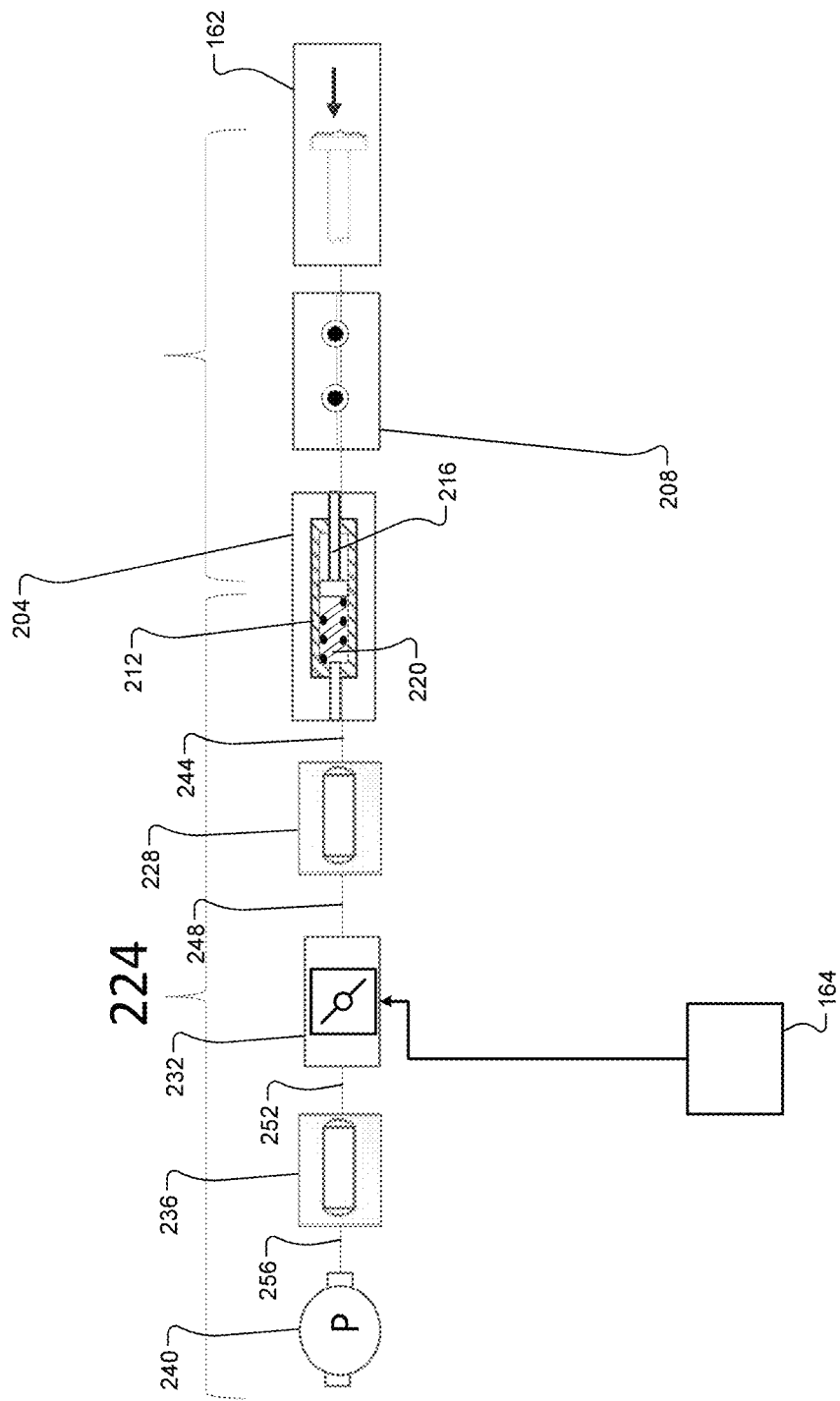
FIGS. 2 and 3 are functional block diagrams of an example turbocharger system.
Figure 3:
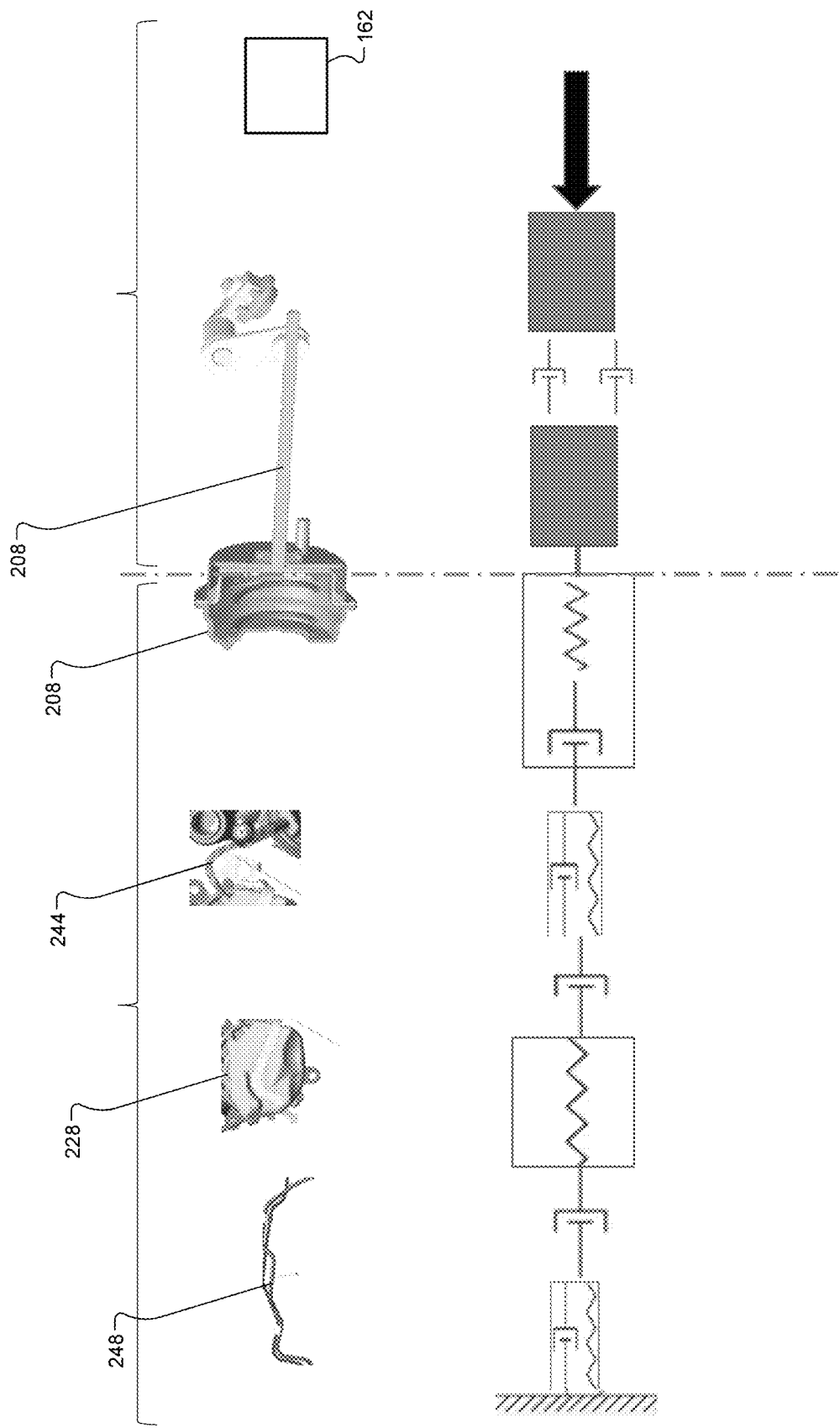

FIGS. 2 and 3 are functional block diagrams of an example implementation wastegate system including a pneumatic resonator. As illustrated, the wastegate 162 may be a poppet valve. The exhaust pressure increases for each combustion event and decreases after each combustion event. Pulses in the exhaust pressure apply force to the wastegate 162. FIG. 4 includes an example graph of force 404 on the wastegate 162 over time 408.

A wastegate actuator 204 actuates the wastegate 162 via one or more mechanical linkages 208, such as one or more bars, arms, etc. The wastegate actuator 204 includes a housing (a canister) 212, a lever 216, and a spring 220. The lever 216 may seal the housing 212 or a seal may be included to seal the housing 212 such that the lever 216 can be actuated pneumatically. The chamber on the spring side is sealed via the diaphragm. The chamber on the lever 216 side is vented to atmosphere and may not be sealed. The spring 220 is disposed within the housing 212 and biases the lever 216 toward the aperture to open the wastegate 162. The lever 216 may seal the housing 212 or a seal may be included to seal the housing 212 such that the lever 216 can be actuated pneumatically.

A pneumatic (e.g., vacuum or positive pressure) system 224 is fluidly connected to a second aperture of the wastegate actuator 204. While the example of the wastegate actuator 204 is shown for the example of a vacuum pneumatic system, the present application is also applicable to the use of positive pressure for actuation.

The pneumatic system 224 includes a resonator 228, a regulator valve 232, an accumulator 236, and a pneumatic (air) source 240. The resonator 228 is fluidly connected to the second aperture of the wastegate actuator 204 via one or more hoses 244. The resonator 228 is fluidly connected to the regulator valve 232 via one or more hoses 248. The regulator valve 232 is fluidly connected to the accumulator 236 via one or more hoses 252. The accumulator 236 is fluidly connected to the pneumatic source 240 via one or more hoses 256. Hoses may also be referred to as pipes. A system including a resonator with the attributes of volume, impedance(s) and geometry, and pneumatic connections, is used to create a reflective pressure wave with amplitude and phasing to counterforce against the wastegate combustion gas forcing source at the pneumatic-mechanical interface 224 and 225. This is to counteract the motion amplitude of the mechanical system 225 caused by excitation of the natural frequencies of the mechanical wastegate system, that may not otherwise be attenuated. The resonator 228 acts to reduce the amplitude of pressure oscillations in the pneumatic system that result when the mechanical system is excited at a resonant frequency. The mechanical resonance is excited by exhaust gas pressure pulses on the wastegate 162 at a frequency associated with the firing frequency of the engine.

The resonator 228 may create a control system response delay associated with the time to increase and decrease pressure within the wastegate actuator 204. The accumulator 236 acts as an air reservoir to reduce the response delay and also absorbs the pressure pulses from the output of the pneumatic source 240.

The pneumatic system 224 (including the geometry, shape, and volume of components, locations of components, length of components, etc.) is configured to reduce the motion amplitude of the mechanical wastegate system 225 within a predetermined frequency range related to the resonant frequency of the mechanical system 225. The predetermined resonant frequency of the mechanical system 225 aligns with the exhaust pressure pulsation frequency such as 55-60 Hertz within an engine speed range. The predetermined frequency range may be different for different types of mechanical wastegate systems, different wastegate positions, and different spring 220 properties. The exhaust gas pressure pulsation frequency may be different numbers of cylinders.

The resonator 228 includes an interior volume, a geometry, and relative orientation of hoses 224 and 228, and cross-sectional area ratio between the indoor hoses 224 and 228 and resonator at the hose connections. The interior volume of the resonator 228 may be, for example, approximately 110-125 cubic centimeters (cc), such as approximately 119 cc, or another suitable interior volume. A length of the hose(s) 244 may be approximately 100-150 millimeters (mm), such as approximately 123 mm or another suitable length. The cross-sectional area ratio may be 1:10 and 10:1 and the relative orientation of the hoses may be approximately 90 degrees.

The regulator valve 232 regulates airflow between the resonator 228 and the accumulator 236. The regulator valve 232 may also be configured to adjust pressure within the wastegate actuator 204 toward or to atmospheric air pressure. In other words, the regulator valve 232 regulates air pressure within the wastegate actuator 204. The ECM 114 controls actuation (opening and closing) of the regulator valve 232 to achieve the target wastegate opening. For example, the ECM 114 may open the regulator valve 232 to increase vacuum within the wastegate actuator 204 to close the wastegate 162. The ECM 114 may close the regulator valve 232 and connect the wastegate actuator to atmospheric pressure to open the wastegate 162. A length of the hose(s) 248 may be approximately 400-500 millimeters (mm), such as approximately 476 mm or another suitable length. Approximately may mean+/−10% in various implementations.

The accumulator 236 includes an interior volume and is configured to absorb the pressure changes attributable to operation of the pneumatic source 240. The interior volume of the accumulator 236 may be greater than or equal to the interior volume of the resonator 228. The accumulator 236 is configured to minimize a wastegate opening response delay after a request to change the target wastegate opening. The accumulator 236 is designed to compensate for the response delay associated with the resonator 228. The pneumatic source 240 may be an air vacuum pump. The pump may be an electric pump or driven by one or more mechanical components of the engine, such as an exhaust camshaft.

In the example provided, vacuum actuates the lever 216 against the spring 220 and closes the wastegate 162. As the vacuum is decreased, the spring 220 opens the wastegate 162. In the example of the pneumatic source 240 including a positive pressure air pump, the accumulator 236 may be omitted in stances where the volume is not required for a pressure pneumatic system to assure sufficient pressure for rapid wastegate valve opening, and the spring location may be changed to the opposite side of the wastegate actuator 204.

FIG. 3 includes an example spring mass damper diagram for the example where the regulator valve 232 is fully closed. The wastegate actuator 204 acts as a spring and a damper connected in series. The air in the hose(s) 244 act as a spring and a damper connected in parallel. The resonator 228 including its pneumatic connectors act as a spring in series between two dampers. The air in the hose(s) 248 act as a spring and a damper connected in parallel. The regulator valve 232 is illustrated as ground as it is closed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A wastegate system of a vehicle, comprising:
a wastegate valve configured to regulate exhaust flow through a turbine of a turbocharger of an engine;
a wastegate actuator including a lever that is mechanically coupled to the wastegate valve via one or more linkages and that is configured to move linearly based on a pressure within an interior of the wastegate actuator;
a resonator that is fluidly coupled to the interior of the wastegate actuator via a first one or more hoses and that is configured to counteract force attributable to pressure changes in the exhaust from combustion events within the engine; and
a regulator valve that is fluidly connected between a pneumatic source and the resonator via a second one or more hoses and that is configured to regulate the pressure within the interior of the wastegate actuator.

2. The wastegate system of claim 1 further comprising an accumulator that is fluidly coupled between the pneumatic source and the regulator valve via a third one or more hoses and that is configured to damp pressure changes from the pneumatic source.

3. The wastegate system of claim 2 wherein a first interior volume of the accumulator is greater than a second interior volume of the resonator.

4. The wastegate system of claim 2 wherein the second one or more hoses are connected between the accumulator and the regulator valve.

5. The wastegate system of claim 1 further comprising an engine control module configured to actuate the regulator valve based on a target opening of the wastegate valve.

6. The wastegate system of claim 1 wherein the resonator, the first one or more hoses, and the second one or more hoses are configured to reduce an amplitude of motion of the lever, the one or more linkages, and the wastegate valve in a predetermined frequency range.

7. The wastegate system of claim 1 wherein an interior volume of the resonator is approximately 110-125 cubic centimeters (cc).

8. The wastegate system of claim 1 wherein a length of the first one or more hoses is approximately 100-150 millimeters (mm).

9. The wastegate system of claim 1 wherein a length of the second one or more hoses is approximately 400-500 millimeters (mm).

10. The wastegate system of claim 1 wherein the wastegate actuator further includes a spring configured to oppose the pressure within the interior of the wastegate actuator.

11. The wastegate system of claim 1 wherein the pneumatic source is an electric pneumatic pump.

12. The wastegate system of claim 1 wherein the pneumatic source is driven by rotation of a rotating component of the engine.

13. The wastegate system of claim 12 wherein the rotating component is an exhaust camshaft.

14. The wastegate system of claim 1 wherein vacuum within the interior of the wastegate actuator closes the wastegate valve and a decrease in vacuum within the interior of the wastegate actuator opens the wastegate valve.

15. The wastegate system of claim 1 wherein positive pressure within the interior of the wastegate actuator closes the wastegate valve and a decrease in the pressure within the interior of the wastegate actuator opens the wastegate valve.

16. A wastegate system of a vehicle, comprising:
a wastegate valve configured to regulate exhaust flow through a turbine of a turbocharger of an engine;
a wastegate actuator including a lever that is mechanically coupled to the wastegate valve via one or more linkages and that is configured to move linearly based on a pressure within an interior of the wastegate actuator;
a resonator that is fluidly coupled to the interior of the wastegate actuator via a first one or more hoses and that is configured to damp motion of the lever, the one or more linkages, and the wastegate valve attributable to pressure changes in the exhaust from combustion events within the engine;
a pneumatic source;
a regulator valve that is configured to regulate the pressure within the interior of the wastegate actuator; and
an accumulator that is fluidly coupled to the regulator valve via a second one or more hoses, that is fluidly coupled to the pneumatic source via a third one or more hoses, and that is configured to damp pressure changes from the pneumatic source,
wherein wastegate actuator further includes a spring configured to oppose the pressure within the interior of the wastegate actuator.

17. The wastegate system of claim 16 wherein a first interior volume of the accumulator is greater than a second interior volume of the resonator.

18. The wastegate system of claim 16 further comprising an engine control module configured to actuate the regulator valve based on a target opening of the wastegate valve.

19. The wastegate system of claim 16 wherein the resonator, the first one or more hoses, and the second one or more hoses are configured to damp motion of the lever, the one or more linkages, and the wastegate valve in a predetermined frequency range.

20. The wastegate system of claim 16 wherein the pneumatic source is one of (a) an electric pneumatic pump and (b) driven by rotation of a rotating component of the engine.

* * * * *